(12) United States Patent  (10) Patent No.: US 9,721,136 B2
Hama et al.  (45) Date of Patent: Aug. 1, 2017

(54) IMAGE CORRECTION APPARATUS AND IMAGE CORRECTION METHOD

(71) Applicant: FUJITSU LIMITED, Kawasaki-shi, Kanagawa (JP)

(72) Inventors: Soichi Hama, Atsugi (JP); Takahiro Aoki, Kawasaki (JP); Mitsuaki Fukuda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 14/636,341

(22) Filed: Mar. 3, 2015

(65) Prior Publication Data

US 2015/0269406 A1 Sep. 24, 2015

(30) Foreign Application Priority Data

Mar. 20, 2014 (JP) ................................. 2014-058919

(51) Int. Cl.
G06K 9/00 (2006.01)
G06K 9/32 (2006.01)
G06T 5/00 (2006.01)

(52) U.S. Cl.
CPC ..... *G06K 9/00006* (2013.01); *G06K 9/00033* (2013.01); *G06K 9/00221* (2013.01); *G06K 9/3208* (2013.01); *G06T 5/00* (2013.01); *G06K 2009/00932* (2013.01)

(58) Field of Classification Search
None
See application file for complete search history.

(56) References Cited

U.S. PATENT DOCUMENTS

| 8,781,177 B2 * | 7/2014 | Chiang | G06K 9/00013 |
| | | | 382/115 |
| 9,129,277 B2 * | 9/2015 | MacIntosh | G06Q 20/208 |
| 9,275,277 B2 * | 3/2016 | Onen | G06F 3/017 |
| 9,342,726 B2 * | 5/2016 | Fukuda | G06K 9/00013 |
| 9,495,576 B2 * | 11/2016 | Aoki | G06K 9/00033 |
| 2011/0222740 A1 | 9/2011 | Kitane | |
| 2012/0235993 A1 * | 9/2012 | Kim | A61B 6/032 |
| | | | 345/419 |

(Continued)

FOREIGN PATENT DOCUMENTS

JP 2007-233981 A 9/2007
JP 2011-191838 A 9/2011

OTHER PUBLICATIONS

Yoruk et al., "Hand biometrics", Image and Vision Computing 24 (2006) 483-497.*

(Continued)

*Primary Examiner* — Soo Park
(74) *Attorney, Agent, or Firm* — Fujitsu Patent Center

(57) ABSTRACT

An image correction apparatus includes a correction amount calculating unit which calculates, in response to a position of a hand on an image, a correction amount for placing the hand to face an imaging unit included in an image acquiring unit for generating the image; and a correcting unit which corrects an estimated coordinate representing a position of a point in a real space corresponding to each pixel included in a region in which the hand is captured in the image in accordance with the correction amount, and projects each of the points after the correction on a corrected image to generate the corrected image.

16 Claims, 5 Drawing Sheets

(56) References Cited

U.S. PATENT DOCUMENTS

| | | |
|---|---|---|
| 2013/0094764 A1* | 4/2013 | Campbell ............... G06T 5/006 382/199 |
| 2014/0044322 A1 | 2/2014 | Kumar et al. |
| 2015/0254492 A1* | 9/2015 | Aoki .................. G06K 9/00033 382/115 |

OTHER PUBLICATIONS

Sato et al., "A contactless palm recognition system using simple active 3D measurement with diffraction grating laser", 2013 Second IAPR Asian Conference on Pattern Recognition.*

Liang et al., "Model-based hand pose estimation via spatial-temporal hand parsing and 3D fingertip localization", Vis Comput (2013) 29: 837-848.*

Methani et al., "Pose invariant palmprint recognition", ICB 2009, LNCS 5558, pp. 577-586, 2009.*

Kurakin et al., "A real time system for dynamic hand gesture recognition with a depth sensor", EUSIPCO 2012.*

Extended European Search Report dated Nov. 23, 2015 for corresponding European Patent Application No. 15156918.3, 8 pages.

Kanhangad, Vivek et al., "Contactless and Pose Invariant Biometric Identification Using Hand Surface", IEEE Transactions on Image Processing, vol. 20, No. 5, May 1, 2011, pp. 1415-1424, XP011411790.

Morales, Aythami et al., "On the Feasibility of Interoperable Schemes in Hand Biometrics", Sensors, vol. 12, No. 12, Feb. 1, 2012, pp. 1352-1382, XP055188149.

Kumar, Ajay et al., "Personal Authentication Using Hand Vein Triangulation and Knuckle Shape", IEEE Transactions on Image Processing, vol. 18, No. 9, Sep. 1, 2009, pp. 2127-2136, XP011293620.

Aoyama, Shoichiro et al., "A Contactless Palmprint Recognition Algorithm for Mobile Phones", International Workshop on Advanced Image Technology 2013, Jan. 7, 2013, pp. 409-413, XP055228515.

Li, Wei et al., "Efficient Joint 2D and 3D Palmprint Matching with Alignment Refinement", 2010 IEEE Conference on Computer Vision and Pattern Recognition (CVPR), Jun. 13, 2010, pp. 795-801, XP031725959.

\* cited by examiner

IMAGE CORRECTION APPARATUS AND IMAGE CORRECTION METHOD

CROSS-REFERENCE TO RELATED APPLICATION

This application is based upon and claims the benefit of priority of the prior Japanese Patent Application No. 2014-058919, filed on Mar. 20, 2014, and the entire contents of which are incorporated herein by reference.

FIELD

The embodiments discussed herein are related to an image correction apparatus, an image correction method, and a computer program for image correction.

BACKGROUND

Recent years have seen development of biometric authentication technology for determining whether or not to authenticate an individual, by using biometric information such as a fingerprint or a vein pattern. The biometric authentication technology is widely used for accessibility determination as to a variety of services, such as determination on room entry/exit, judgment on computer accessibility, or user verification in on-line transactions.

In biometric authentication, for example, biometric information of a user is acquired by a sensor, and an image representing the biometric information is used for matching. A biometric authentication device compares a biometric image representing biometric information of a user with a biometric image representing biometric information of a registered user stored in advance, and determines whether the biometric information of the user matches the biometric information of the registered user, for example. When it is determined that the biometric information of the user matches the biometric information of the registered user, the biometric authentication device authenticates the user as the registered user.

Sensors for acquiring biometric information include a contactless sensor capable of capturing biometric information in a manner such that the sensor does not come into contact with a body part containing the biometric information. For example, a contactless vein sensor for capturing a vein pattern of a hand as biometric information is used.

A contactless sensor has a merit that the sensor is hygienic because the user does not have to touch the sensor when biometric information of the user is captured. Further, the contactless sensor is capable of capturing biometric information, without making the user feel restrained. Thus, the contactless sensor has good usability.

On the other hand, a body part containing biometric information can take any posture when capturing the biometric information. In some cases, the posture of a body part containing biometric information with respect to a sensor may be inappropriate for capturing the biometric information. In a worse case, biometric information represented in an image may be distorted. When biometric information represented in an image is distorted, it is difficult or impossible to extract feature points of the biometric information from the image. As compared with a case, in which biometric information is not distorted, a relative positional relationship between feature points may change, and authentication precision may be deteriorated. In view of the above, some techniques for correcting distortion of biometric information represented in an image has been proposed (e.g. see Japanese Laid-open Patent Publication No. 2011-191838 and Japanese Laid-open Patent Publication No. 2007-233981).

For example, Japanese Laid-open Patent Publication No. 2011-191838 discloses detecting a finger shift amount from a correct finger placement position with respect to a finger vein authentication device, from fingertip shape data and finger outline data, for correcting an acquired finger vein pattern.

Further, Japanese Laid-open Patent Publication No. 2007-233981 discloses correcting image enlargement/reduction, parallel displacement, or rotation by carrying out a log-polar transformation of a vein image, or correcting an inclination so that the vein side is aligned perpendicular to the camera optical axis.

SUMMARY

When biometric information is captured by a contactless sensor, an increase in the distance from the sensor to a body part containing the biometric information may make it difficult for the user to recognize the image capturing area of the sensor. This may lower the usability of the biometric authentication device. In view of the above, an imaging optical system with a wide-angle sensor may be used in order to capture the entire biometric information, even when a short distance between a body part containing the biometric information and the sensor. Generally, as the viewing angle of an imaging optical system increases, it is difficult to reduce distortion aberration. The amount of distortion aberration varies depending on the viewing angle. Therefore, distortion of biometric information represented in an image generated by a sensor employing a wide-angle imaging optical system may change depending on the position of a body part containing the biometric information on the image, due to distortion aberration. In view of the above, in some of the biometric authentication devices, image processing of correcting distortion aberration is carried out on an image obtained by a sensor, and the processed image is used for biometric authentication.

Correction of distortion aberration is a process in orthogonal coordinate system in which an image is corrected such that the interval between coordinates projected on an imaging plane of a sensor is uniformed, without depending on the coordinates. On the other hand, capturing biometric information by a sensor is a process of polar coordinate system in which an image obtained by projecting biometric information as viewed in a radial direction on an imaging plane, assuming that a front principal point of the imaging optical system is a viewpoint. Therefore, when a body part containing biometric information, which is a stereoscopic subject, is deviated from the optical axis of an imaging optical system, and if an inclination of the body part is corrected in such a manner that a surface of the body part facing the imaging optical system is aligned perpendicular to the optical axis of the imaging optical system, as described in Japanese Laid-open Patent Publication No. 2007-233981, contradiction may occur in the image representing the biometric information. As a result, the biometric information represented in the image may be distorted, even if distortion aberration is corrected. This may be a cause of deterioration of authentication precision.

According to one embodiment, an image correction apparatus is provided. The image correction apparatus includes a correction amount calculation unit which calculates, in response to a position of a hand on an image, a correction amount for placing the hand to face an imaging unit included in an image acquiring unit for generating the image; and a correction unit which corrects an estimated coordinate representing a position of a point in a real space corresponding to each pixel included in a region in which the hand is captured in the image in accordance with the correction amount, and projects each of the points after the correction on a corrected image to generate the corrected image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
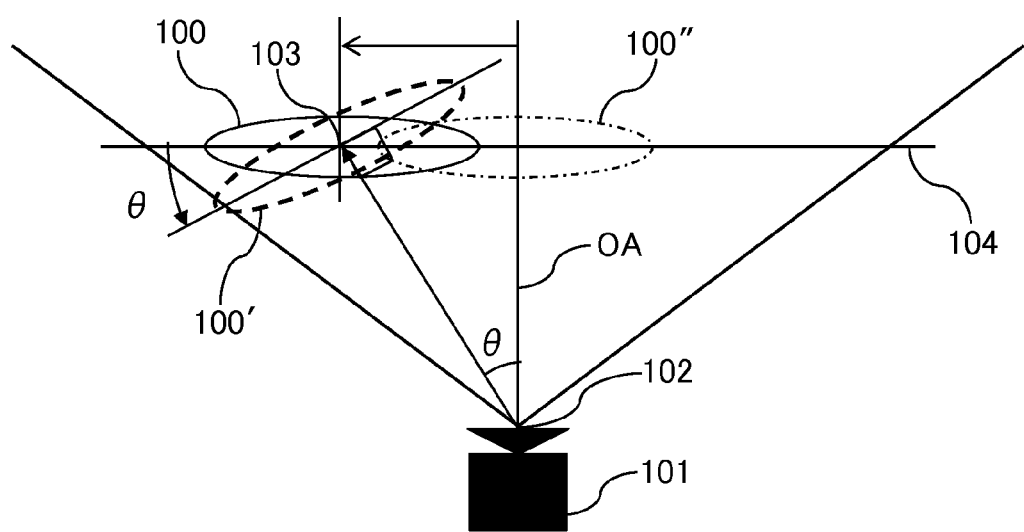
FIG. 1 is a diagram illustrating a relationship between a position of a hand and inclination correction of the hand.

In the following, an image correction apparatus according to an embodiment will be described with reference to the drawings. FIG. 1 is a diagram illustrating a relationship between a position of a hand and inclination correction of the hand. In FIG. 1, a hand 100 is located in the direction of the angle θ with respect to the optical axis OA of an imaging optical system, as viewed from a viewpoint 102, which is a front principal point of the imaging optical system of an image acquiring unit 101 for capturing biometric information. Since the hand 100 has a thickness, the direction of each feature point on the surface of or inside the hand 100, as viewed from the viewpoint 102, differs depending on the position of each feature point in the depthwise direction. Therefore, as described in Japanese Laid-open Patent Publication No. 2007-233981, when the inclination of the hand is corrected in such a manner that the hand is aligned perpendicular to the optical axis OA, the direction of each feature point as viewed from the viewpoint 102 changes depending on the position of each feature point in the depthwise direction. As a result, biometric information such as a vein pattern contained in the hand 100, which is represented in an image, may be distorted by the inclination correction.

In view of the above, in the embodiment, the image correction apparatus estimates the position of the hand 100 in the real space, from the hand 100 represented in an image, and virtually inclines the hand 100 at the estimated position by the angle θ so that the hand 100 faces the image acquiring unit 101, preferably, faces the viewpoint 102 of the image acquiring unit 101. Thereby, the palm of the hand or the back of the hand is aligned orthogonal to the line of sight directing from the viewpoint 102 toward the hand 100. As illustrated by the dotted line in FIG. 1, the image correction apparatus acquires a corrected image by perspectively projecting a hand 100' placing in front of the viewpoint 102 on an imaging plane. The position of the hand 100 on the image has a one-to-one relationship with the direction directing from the viewpoint to the hand 100. Therefore, the image correction apparatus is capable of obtaining an angle by which the hand 100 is inclined in accordance with the position of the hand 100 on the image.

In the following embodiment, it is assumed that biometric information for use in biometric authentication is a vein pattern of a hand. Biometric information for use in biometric authentication may be the other biometric information contained in a hand, for example, a palm print.

Further, the term "matching process" is used to refer to a process for calculating an index that indicates a degree of difference or a degree of similarity between biometric information of a user and biometric information of a registered user. Further, the term "biometric authentication process" is used to refer to the entire authentication process that includes not only the matching process but also a process for determining whether or not to authenticate the user by using the index obtained by the matching process.

Furthermore, the term "horizontal direction" indicates a transverse direction in a vein image to be generated by the biometric information acquiring unit, and a direction on a plane in parallel to the imaging plane of the imaging optical system of the biometric information acquiring unit, which is associated with the transverse direction on the vein image, unless otherwise particularly specified. Likewise, the term "vertical direction" is a vertical direction on a vein image to be generated by the biometric information acquiring unit, and a direction on a plane in parallel to the imaging plane of the imaging optical system of the biometric information acquiring unit, which is associated with the vertical direction on the vein image, unless otherwise particularly specified.

Figure 2:
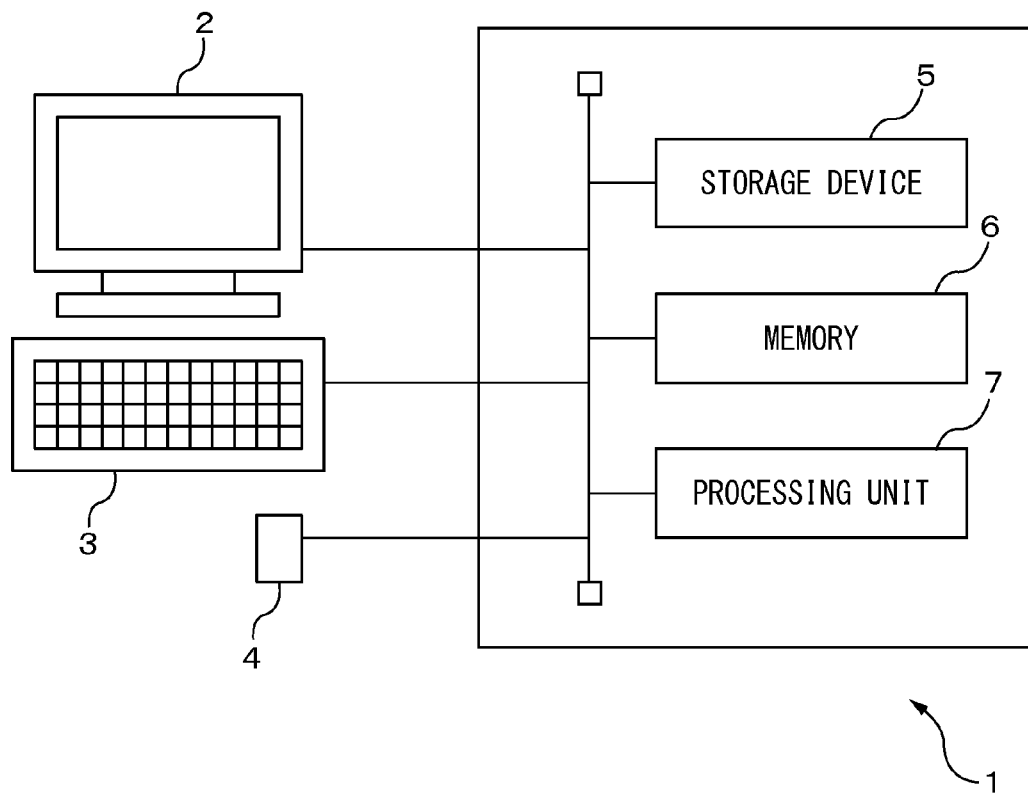
FIG. 2 is a schematic diagram illustrating a configuration of a biometric authentication device as an embodiment of an image correction apparatus.

FIG. 2 is a schematic diagram illustrating a configuration of a biometric authentication device, as an embodiment of the image correction apparatus. As illustrated in FIG. 2, the biometric authentication device 1 includes a display unit 2, an input unit 3, a biometric information acquiring unit 4, a storage device 5, a memory 6, and a processing unit 7. The display unit 2, the input unit 3, and the biometric information acquiring unit 4 may be provided separately from a housing containing the storage device 5, the memory 6, and the processing unit 7. Alternatively, the display unit 2, the input unit 3, the biometric information acquiring unit 4, the storage device 5, the memory 6, and the processing unit 7 may be contained in one housing. The biometric authentication device 1 may further include a storage medium access device (not illustrated) for accessing a storage medium such as a semiconductor memory card and an optical storage medium. The biometric authentication device 1 may read a biometric authentication processing computer program that is stored in the storage medium and to be executed on the processing unit 7, for example, via the storage medium access device, and may execute a biometric authentication process in accordance with the computer program.

The biometric authentication device 1 carries out a biometric authentication process, using a vein image representing a vein pattern of a user's hand generated by the biometric information acquiring unit 4, by carrying out matching the vein pattern with each of vein patterns of registered users. When authenticating the user as one of the registered users as a result of biometric authentication process, the biometric authentication device 1 permits the user to use an apparatus in which the biometric authentication device 1 is incorporated. Alternatively, the biometric authentication device 1 may transmit, to an unillustrated another apparatus, a signal indicating that the user is authenticated, and permit the user to use the another apparatus.

The display unit 2 includes a display device such as a liquid crystal display, for example. The display unit 2 displays, for a user, a guidance message indicating the position where the user should place the hand, for example. The display unit 2 also displays a message indicating a result of biometric authentication process carried out by the processing unit 7, various kinds of information associated with an ongoing application, or the like.

The input unit 3 includes a user interface such as a keyboard, a mouse, and a touch pad, for example. User identification information such as a user name or a user number, or a command or data, entered by a user via the input unit 3 is passed to the processing unit 7. However, when a user does not have to enter information other than the biometric information to the biometric authentication device 1, the input unit 3 may be omitted.

The biometric information acquiring unit 4 is an example of the image acquiring unit. The biometric information acquiring unit 4 captures a vein pattern of one of the user's hands from the palm side of the hand, for example, and generates a vein image representing the vein pattern of the hand.

Figure 3:
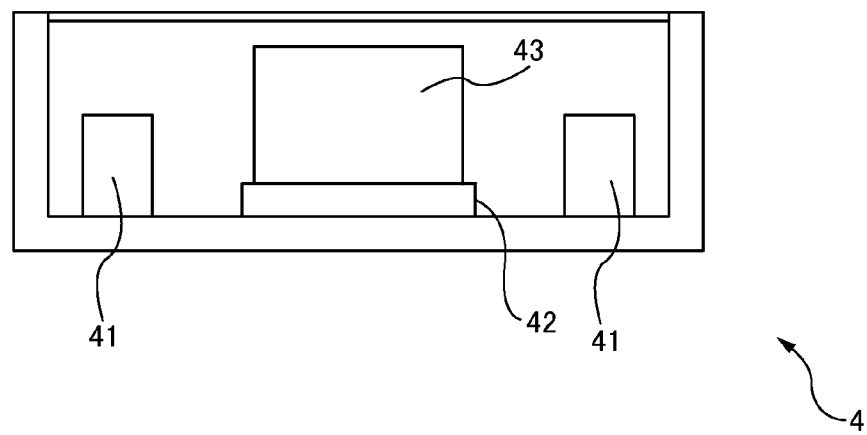
FIG. 3 is a schematic sectional side view of a biometric information acquiring unit.

FIG. 3 is a schematically sectional side view of the biometric information acquiring unit 4. The biometric information acquiring unit 4 includes an illumination light source 41 which emits near infrared light for illuminating the user's hand, an area sensor 42 constituted of solid-state imaging elements of a two-dimensional array having a sensitivity to the near infrared light, and an imaging optical system 43 which forms an image of a predetermined capturing area on the area sensor 42. The illumination light source 41, the area sensor 42, and the imaging optical system 43 are contained in a rectangular parallelepiped housing 44, whose upper end is covered by a resin member transmissive to near infrared light. The imaging optical system 43 may be configured to have a wide-angle lens whose diagonal angle of view is 70° or larger, for example, so that a region above the biometric information acquiring unit 4 by several centimeters serves as an image capturing area, and the entire vein pattern of the hand placed in the image capturing area is captured as a vein image.

Alternatively, the biometric information acquiring unit 4 may include one or more distance sensors disposed around the imaging optical system so as to measure the distance to the user's hand.

The biometric information acquiring unit 4 outputs a vein image each time the vein image is generated. When the biometric information acquiring unit 4 includes a distance sensor, a measurement value of distance to the user's hand may be output to the processing unit 7 at the time of generating a vein image.

The storage device 5 is an example of a storage unit, and includes a magnetic recording disk and a magnetic recording disk access device, for example. The storage device 5 stores an application program for use in the biometric authentication device 1, the user name, the user identification number, and personal setting information of at least one registered user, and various kinds of data. The storage device 5 also stores a program for carrying out a biometric authentication process. Further, for each registered user, the storage device 5 stores feature information for matching representing the features of the vein pattern of one of the user's hands as the registered biometric information of the registered user, along with the user identification information of the registered user such as the user name and the user identification number of the registered user. The feature information for matching of the registered user is obtained by a registration process to be described later, and is stored in the storage device 5.

The memory 6 is another example of the storage unit, and includes, for example, a non-volatile semiconductor memory and a volatile semiconductor memory. The memory 6 temporarily stores various kinds of data to be used by a program running on the processing unit 7.

The processing unit 7 includes one or more processors and peripheral circuitry thereof. The processing unit 7 acquires a vein image representing the vein pattern of one of the hands of the user or of the registered user from the biometric information acquiring unit 4. The processing unit 7 corrects an estimated coordinate representing each of the positions of points in the real space corresponding to the pixels included in the region of the hand represented in the vein image in such a manner that the hand faces the imaging optical system of the biometric information acquiring unit 4 in accordance with the position of the hand on the vein image. Then, the processing unit 7 obtains a corrected vein image by perspectively projecting the respective points after the correction on the imaging plane of the biometric information acquiring unit 4. The processing unit 7 extracts feature information for matching from the corrected vein image, and carries out a biometric authentication process or a registration process by using the feature information for matching.

Figure 4:
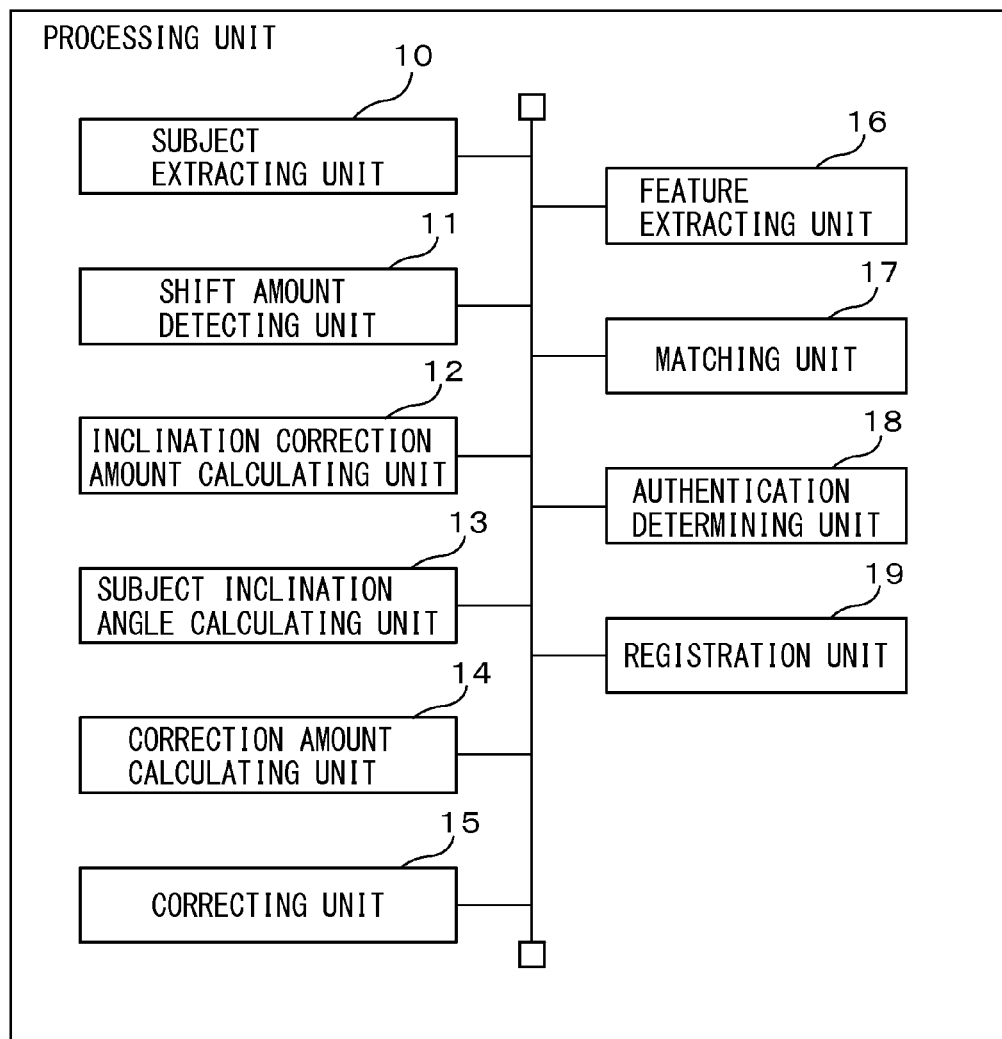
FIG. 4 is a functional block diagram of a processing unit of the biometric authentication device.

FIG. 4 is a functional block diagram of the processing unit 7. As illustrated in FIG. 4, the processing unit 7 includes a subject extracting unit 10, a shift amount detecting unit 11, an inclination amount calculating unit 12, a subject inclination angle calculating unit 13, a correction amount calculating unit 14, a correcting unit 15, a feature extracting unit 16, a matching unit 17, an authentication determining unit 18, and a registration unit 19. These units constituting the processing unit 7 are functional modules implemented by a computer program executed on the processor contained in the processing unit 7. Alternatively, these units constituting the processing unit 7 may be implemented as firmware on the biometric authentication device 1.

The subject extracting unit 10, the shift amount detecting unit 11, the inclination correction amount calculating unit 12, the subject inclination angle calculating unit 13, the correction amount calculating unit 14, the correcting unit 15, and the feature extracting unit 16 are used in both of the biometric authentication process and the registration process. Among these units, the subject extracting unit 10, the shift amount detecting unit 11, the inclination correction amount calculating unit 12, the subject inclination angle calculating unit 13, the correction amount calculating unit 14, and the correcting unit 15 are associated with an image correction process. The matching unit 17 and the authentication determining unit 18 are used in the biometric authentication process. On the other hand, the registration unit 19 is used in the registration process. In view of the above, in the following, the processes common in the biometric authentication process and the registration process are described.

The subject extracting unit 10 discriminates a subject region in which a hand is represented in a vein image, and a background region in which the hand is not represented, and extracts the subject region. For example, when the illumination light source and the area sensor of the biometric information acquiring unit 4 are disposed to face one side of the hand, the luminance value of a pixel in the region in which the hand is represented is higher than the luminance value of a pixel in the region in which the hand is not represented. In view of the above, the subject extracting unit 10 extracts, for example, a group of pixels whose luminance values are equal to or larger than a subject determination threshold value, as a subject region. The subject determination threshold value is set, for example, to a predetermined fixed value (e.g. 10), or an average value of luminance values of pixels in a vein image.

The subject extracting unit 10 notifies the shift amount detecting unit 11 of information representing a subject region. The information representing a subject region may be a binary image of the same size as the size of a vein image, which is configured such that the value of a pixel included in the subject region and the value of a pixel included in the background region differ from each other. Alternatively, the information representing a subject region may be data at an uppermost and leftmost coordinate, and data at a lowermost and rightmost coordinate of a circumscribed rectangle of the subject region.

The shift amount detecting unit 11 obtains a distance from the center of a vein image, which is associated with the optical axis of the biometric information acquiring unit 4, to a reference point as a pivot point around which the hand is virtually rotated in accordance with the position of the hand on the vein image.

For example, the shift amount detecting unit 11 sets a point having a predetermined positional relationship with a subject region as the reference point. For example, the shift amount detecting unit 11 may set any point in a subject region as the reference point. In preferable, the shift amount detecting unit 11 may set the centroid of a subject region, or the center of a circumscribed rectangle of a subject region, or the center of an inscribed rectangle of a subject region as the reference point. Setting the reference point as described above makes it possible for the shift amount detecting unit 11 to accurately set an inclination angle by which the hand is inclined to face the viewpoint of the imaging optical system.

The shift amount detecting unit 11 obtains a shift amount $\Delta x (=Rx-Cx)$ in a horizontal direction and a shift amount $\Delta y (=Ry-Cy)$ in a vertical direction from the center (Cx, Cy) of a vein image, which is associated with the optical axis of the imaging optical system of the biometric information acquiring unit 4 to the reference point (Rx, Ry). The shift amount detecting unit 11 notifies the inclination correction amount calculating unit 12 of the shift amount $\Delta x$ in a horizontal direction and the shift amount $\Delta y$ in a vertical direction. Further, the shift amount detecting unit 11 notifies the correcting unit 15 of the coordinate of the reference point.

The inclination correction amount calculating unit 12 calculates an inclination correction angle, which is an angle by which a plane at a reference point in parallel to the imaging plane of the imaging optical system of the biometric information acquiring unit 4 is inclined so as to face the imaging optical system, preferably, so as to face the viewpoint of the imaging optical system. In other words, the inclination correction angle is an angle by which the plane in parallel to the imaging plane is inclined to be orthogonal to the direction directing from the viewpoint of the imaging optical system to a point in the real space corresponding to the reference point.

Referring back to FIG. 1 again, it is clear that the inclination correction angle is equal to the angle θ between the direction directing from the viewpoint 102 to a point 103 in the real space corresponding to the reference point, and the optical axis OA of the imaging optical system of the biometric information acquiring unit 4. In view of the above, the inclination correction amount calculating unit 12 calculates the angle θ defined by the direction directing from the viewpoint to the point in the real space corresponding to the reference point, and the optical axis OA of the imaging optical system.

Each pixel on a vein image has a one-to-one correspondence with the direction as viewed from the viewpoint. Further, the center of the vein image is associated with the optical axis OA. Therefore, the distance (in units of pixel number) from the center pixel of a vein image to a target pixel has a one-to-one correspondence with the angle between the direction as viewed from the viewpoint, which corresponds to the target pixel, and the optical axis OA. The relationship is established also in the case where the imaging optical system has distortion aberration. In view of the above, there is prepared in advance a correspondence table, in which shift amounts ($\Delta x$, $\Delta y$) in a horizontal direction and in a vertical direction, and inclination correction angles ($\theta x$, $\theta y$) in a horizontal direction and in a vertical direction corresponding to the shift amounts ($\Delta x$, $\Delta y$) are associated with each other. The correspondence table is stored in the storage device 5. The inclination correction amount calculating unit 12 can obtain inclination correction angles ($\theta x$, $\theta y$) in a horizontal direction and in a vertical direction, which are associated with the shift amounts ($\Delta x$, $\Delta y$) in a horizontal direction and in a vertical direction, referring to the correspondence table.

Alternatively, the inclination correction amount calculating unit 12 may obtain a distance Z from the viewpoint (namely, the front principal point) of the imaging optical system of the biometric information acquiring unit 4 to the hand, by using an image analysis method for calculating a distance from the viewpoint to a subject and an inclination of the subject on the basis of an image, such as a "Shape from Shading" method. Further alternatively, when the biometric information acquiring unit 4 includes a distance sensor, the distance Z from the viewpoint to the hand may be obtained by adding a distance from the distance sensor to the viewpoint of the imaging optical system along the optical axis, to a measurement value of distance by the distance sensor. Then, the inclination correction amount calculating unit 12 may project a reference point on a plane in parallel to the imaging plane, which is located at a position away from the viewpoint by the obtained distance, on the basis of the shift amount $\Delta x$ in a horizontal direction, the shift amount $\Delta y$ in a vertical direction, the size of the area sensor per pixel, and the focal distance of the imaging optical system. This makes it possible to obtain distances ($\Delta X w$, $\Delta Y w$) in a horizontal direction and in a vertical direction from the optical axis OA to a point in the real space, which corresponds to the reference point. The inclination correction amount calculating unit 12 may calculate an inclination correction angle $\theta x$ in a horizontal direction and an inclination correction angle $\theta y$ in a vertical direction according to the following equations (1).

$$\theta_x = a\tan(\Delta X_w/Z)$$

$$\theta_y = a\tan(\Delta Y_w/Z) \tag{1}$$

The inclination correction amount calculating unit 12 notifies the correction amount calculating unit 14 of the inclination correction angle $\theta x$ in a horizontal direction and the inclination correction angle $\theta y$ in a vertical direction.

The subject inclination angle calculating unit 13 calculates a subject inclination angle, which is an inclination angle of the hand, with respect to the imaging plane of the imaging optical system of the biometric information acquiring unit 4. For example, the subject inclination angle calculating unit 13 calculates a subject inclination angle αx in a horizontal direction and a subject inclination angle αy in a vertical direction, by using an image analysis method such as a "Shape from Shading" method.

The biometric information acquiring unit 4 may include a plurality of distance sensors disposed around the imaging optical system. In this case, the subject inclination angle calculating unit 13 may calculate a subject inclination angle αx in a horizontal direction and a subject inclination angle αy in a vertical direction, on the basis of a difference between measurement values of distance measured by the respective distance sensors, and an interval between the distance sensors.

Further alternatively, the subject inclination angle calculating unit 13 may respectively average subject inclination angles in a horizontal direction and in a horizontal direction which have been calculated by an image analysis method, and subject inclination angles in a horizontal direction and in a vertical direction which have been calculated on the basis of measurement by a distance sensor. Then, the subject inclination angle calculating unit 13 may set the average values respectively obtained in a horizontal direction and in a vertical direction, as a subject inclination angle αx in a horizontal direction and a subject inclination angle αy in a vertical direction.

The subject inclination angle calculating unit 13 notifies the correction amount calculating unit 14 of the subject inclination angle cm in a horizontal direction and the subject inclination angle αy in a vertical direction.

The correction amount calculating unit 14 calculates a rotation correction angle Φx in a horizontal direction and a rotation correction angle Φy in a vertical direction for use in virtually placing the hand so as to face the imaging optical system of the biometric information acquiring unit 4, preferably, so as to face the viewpoint of the imaging optical system. In the embodiment, the correction amount calculating unit 14 calculates a rotation correction angle Φx in a horizontal direction and a rotation correction angle Φy in a vertical direction according to the following equations (2).

$$\Phi_x = \alpha_x + \theta_x$$
$$\Phi_y = \alpha_y + \theta_y \quad (2)$$

The correction amount calculating unit 14 notifies the correcting unit 15 of the rotation correction angle Φx in a horizontal direction and the rotation correction angle Φy in a vertical direction.

The correcting unit 15 corrects an estimated coordinate representing the position of a point in the real space corresponding to each pixel included in a subject region, on the basis of the rotation correction angles (Φx, Φy), in such a manner that the hand is virtually placed so as to face the imaging optical system of the biometric information acquiring unit 4, preferably, to face the viewpoint of the imaging optical system. The correcting unit 15 obtains, for the point of the hand corresponding to each pixel included in a subject region, for example, a distance from the viewpoint to each of the points, by using an image analysis method such as a "Shape from Shading" method. The correcting unit 15 can estimate the estimated coordinate representing the position of each of the points in the real space, based on the distance and the direction indicated by the corresponding pixel.

Alternatively, the correcting unit 15 may estimate the estimated coordinate representing the position of a point in the real space corresponding to each pixel included in a subject region, by obtaining a point at which a direction corresponding to each pixel, intersects with a plane passing through a point in the real space corresponding to the reference point and in parallel to the imaging plane. In this case, it is not necessary to obtain a distance for each pixel. This is advantageous in reducing the computation amount.

The correcting unit 15 rotates a point of the hand corresponding to each pixel included in a subject region by the rotation correction angle Φx in a horizontal direction around a line in a vertical direction that passes through a point in the real space corresponding to the reference point, as an axis of rotation. Likewise, the correcting unit 15 rotates a point of the hand corresponding to each pixel included in the subject region by the rotation correction angle Φy in a vertical direction around a line in a horizontal direction that passes through the point in the real space corresponding to the reference point, as an axis of rotation.

Thereafter, the correcting unit 15 perspectively projects each point of the hand on the imaging plane to generate a corrected vein image. Defining an idealistic imaging optical system free of distortion aberration at the time of perspective projection makes it possible to correct distortion of the hand and of a vein pattern of the hand, due to distortion aberration of the imaging optical system, in the corrected vein image. Further, the rotation correction angle is obtained in such a manner as to cancel the inclination of the hand with respect to the imaging plane. Therefore, distortion of the hand and of the vein pattern of the hand due to an inclination of the hand is also corrected in the corrected vein image.

Figure 5:
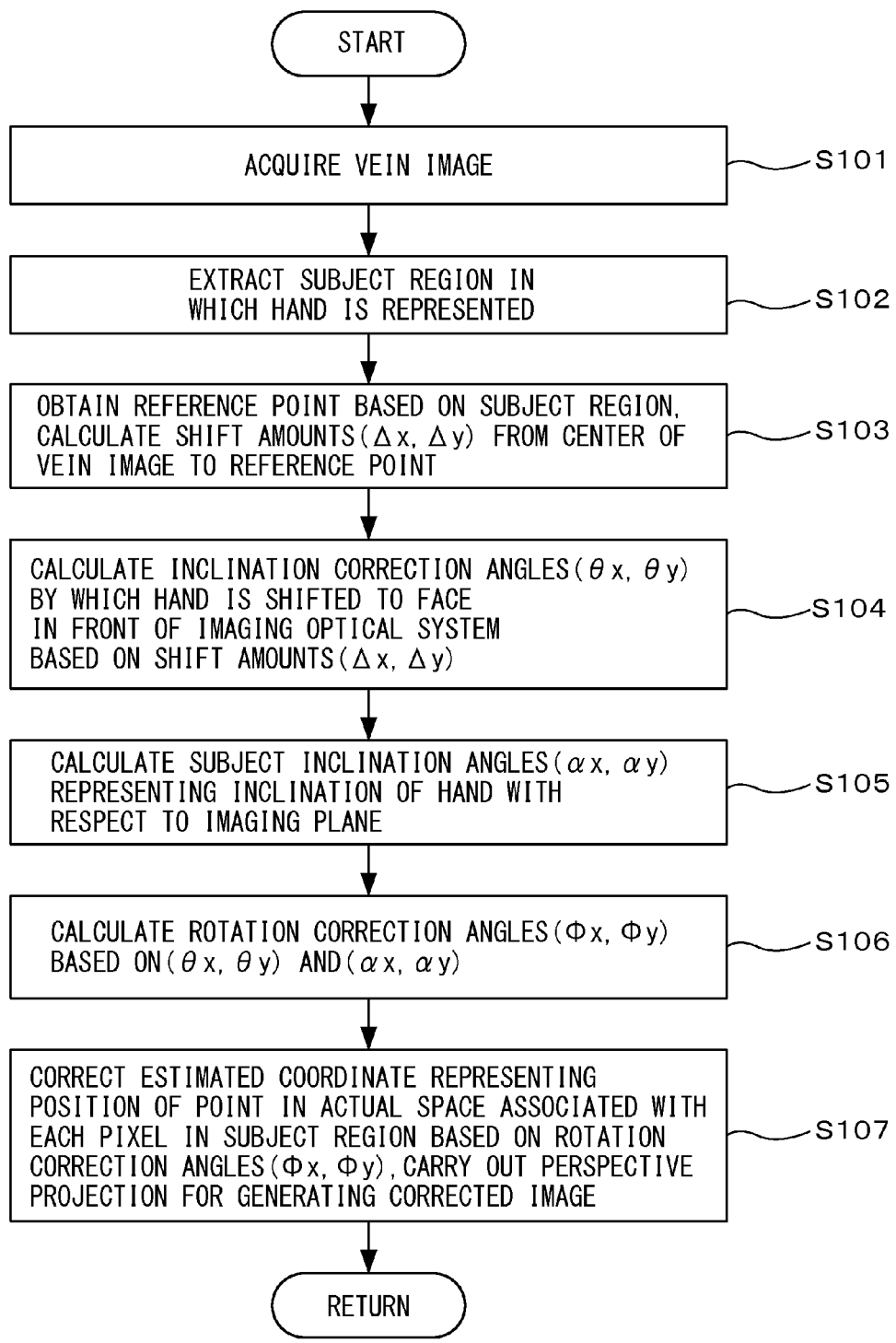
FIG. 5 is a diagram illustrating an operation flowchart of an image correction process.

FIG. 5 is an operation flowchart of the image correction process. The processing unit 7 acquires a vein image from the biometric information acquiring unit 4 (step S101). The subject extracting unit 10 extracts a subject region in which the hand is represented in the vein image (step S102).

The shift amount detecting unit 11 determines a reference point on the basis of the subject region, and obtains a shift amount Δx in a horizontal direction and a shift amount Δy in a vertical direction from the center of the vein image to the reference point (step S103). The inclination correction amount calculating unit 12 calculates an inclination correction angle θx in a horizontal direction and an inclination correction angle θy in a vertical direction for use in virtually placing the hand so as to face the imaging optical system of the biometric information acquiring unit 4, on the basis of the shift amounts Δx, Δy (step S104).

The subject inclination angle calculating unit 13 calculates a subject inclination angle αx representing an inclination of the hand in a horizontal direction, and a subject inclination angle αy representing an inclination of the hand in a vertical direction, with respect to the imaging plane of the biometric information acquiring unit 4 (step S105).

The correction amount calculating unit 14 calculates a rotation correction angle Φx in a horizontal direction and a rotation correction angle Φy in a vertical direction for use in virtually placing the hand so as to face the imaging optical system, on the basis of the inclination correction angles θx, θy, and the subject inclination angles αx, αy (step S106).

The correcting unit 15 corrects the estimated coordinate representing the position of a point in the real space corresponding to each pixel included in the subject region in such a manner that the hand is virtually placed so as to face the imaging optical system in accordance with the rotation correction angles Φx, Φy, and perspectively projects each of the points after the correction on the imaging plane for obtaining a corrected vein image (step S107). Then, the processing unit 7 finishes the image correction process. The corrected vein image is used for the biometric authentication process or for the registration process. For this purpose, the corrected vein image is passed to the feature extracting unit 16.

The feature extracting unit 16 obtains, from the corrected vein image, feature information for matching representing features of the vein pattern of the hand. In the matching process, the feature information for matching is used for determining whether the vein pattern of the user matches the vein pattern of the registered user.

The feature extracting unit 16 extracts the subject region from the corrected vein image. When the extraction is carried out, the feature extracting unit 16 may carry out the same process as carried out by the subject extracting unit 10 on the corrected vein image.

Subsequently, the feature extracting unit 16 binarizes pixels in the subject region or an inscribed rectangular region of the subject region by using a vein determination threshold value, and creates a binary vein image constituted of a pixel group on which the veins may be captured, and a pixel group other than the above pixel group, as binary data. For example, the luminance value of a pixel on which a vein is captured is lower than the luminance values of pixels around the pixel. In view of the above, the feature extracting unit 16 defines a pixel whose luminance value is not larger than the vein determination threshold value, as a pixel on which a vein may be captured, and defines a pixel whose luminance value is larger than the vein determination threshold value, as a pixel on which a vein is not captured. The vein determination threshold value is set to an average value of luminance values of pixels in a subject region, for example. Alternatively, the vein determination threshold value may be determined by carrying out the Otsu's method of a binarization process on a distribution of luminance values of pixels in a subject region. In the following, to simplify the description, a pixel on which a vein may be represented is referred to as a vein candidate pixel.

The feature extracting unit 16 carries out a thinning process on a vein candidate pixel group in the binary vein image so as to form a line obtained by combining the vein candidate pixels into thin lines each having a pixel width, for example. Each of the thinned lines represents one vein. A vein is generally not straight. Therefore, the feature extracting unit 16 divides each of the thinned lines into a plurality of line segments, and approximately indicates each vein by a plurality of line segments.

The feature extracting unit 16 may define a corrected binary vein image as feature information for matching.

The feature extracting unit 16 passes the feature information for matching to the matching unit 17 when carrying out the biometric authentication process.

On the other hand, the feature extracting unit 16 passes the feature information for matching to the registration unit 19 when carrying out the registration process.

(Biometric Authentication Process)

The matching unit 17 matches a vein pattern of a user with a vein pattern of a registered user, by using the feature information for matching of the user received from the feature extracting unit 16, and by using the feature information for matching of the registered user specified by user identification information input via the input unit 3. The matching unit 17 obtains a matching score that represents a degree of similarity of the vein pattern of the user with respect to the vein pattern of the registered user, as a result of matching process.

The matching unit 17 calculates, for example, a distance to a closest line segment among a plurality of line segments contained in the feature information for matching of the registered user, for each of the line segments contained in the feature information for matching of the user. The matching unit 17 calculates an average value of the distances for each line segment, as an evaluation value. The matching unit 17 calculates an evaluation value, while changing a relative position of the vein pattern of the registered user with respect to the vein pattern of the user, and sets an inverse of a minimum value of the evaluation values, as a matching score. When the minimum value of the evaluation values is smaller than 1, the matching score may be set to 1.

When a corrected binary vein image is contained in the feature information for matching, the matching unit 17 calculates a normalized cross-correlation value, while changing a relative position between a corrected binary vein image of the user, and a corrected binary vein image of the registered user. The matching unit 17 may set a maximum value of the normalized cross-correlation values, as a matching score.

The matching unit 17 passes the matching score and identification information of the registered user to the authentication determining unit 18.

When the matching score is equal to or larger than an authentication determination threshold value, the authentication determining unit 18 determines that the vein pattern of the user matches the vein pattern of the registered user. The authentication determining unit 18 authenticates the user as the registered user. When the user is authenticated, the authentication determining unit 18 notifies the authentication result to the processing unit 7.

On the other hand, when the matching score is smaller than the authentication determination threshold value, the authentication determining unit 18 determines that the vein pattern of the user does not match the vein pattern of the registered user. In this case, the authentication determining unit 18 does not authenticate the user. The authentication determining unit 18 notifies the processing unit 7 of an authentication result indicating that authentication of the user has failed. The processing unit 7 may cause the display unit 2 to display a message indicating an authentication result.

The authentication determination threshold value may preferably be set to such a value that the authentication determining unit 18 succeeds in authentication exclusively when one of the registered users is the user. The authentication determination threshold value may preferably be set to such a value that the authentication determining unit 18 fails to authenticate the user, when the user is a person other than the registered users. For example, the authentication determination threshold value may be set to a value obtained by adding, to a minimum value of the degrees of similarity, a value obtained by multiplying a difference between a possible maximum value and a possible minimum value of matching scores with 0.7.

Figure 6:
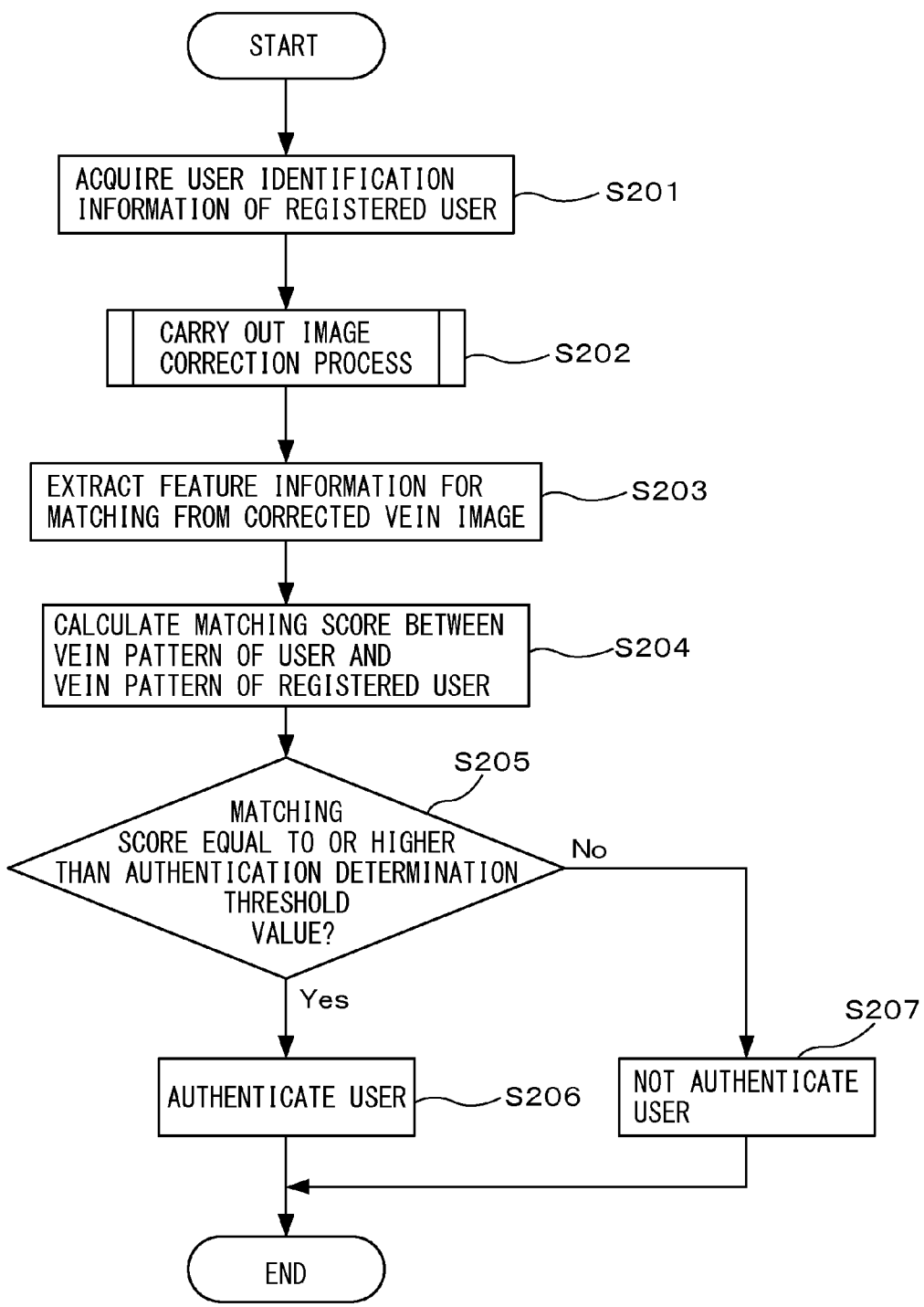
FIG. 6 is a diagram illustrating an operation flowchart of a biometric authentication process.

FIG. 6 is an operation flowchart of the biometric authentication process to be carried out by the processing unit 7. The processing unit 7 acquires user identification information for specifying a registered user to be authenticated via the input unit 3 (step S201). The processing unit 7 receives a vein image of the user who asks for authentication from the biometric information acquiring unit 4. The processing unit 7 carries out an image correction process on the vein image (step S202). The feature extracting unit 16 extracts feature information for matching from the corrected vein image (step S203).

The matching unit 17 reads, from the storage device 5, feature information for matching of a registered user to be specified by the user identification information input via the input unit 3. The matching unit 17 matches the feature information for matching of the user with the feature information for matching of the registered user, and calculates a matching score between the vein pattern of the user and the vein pattern of the registered user (step S204).

The authentication determining unit 18 determines whether the matching score is equal to or larger than the authentication determination threshold value (step S205). When the matching score is equal to or larger than the authentication determination threshold value (Yes in step S205), the authentication determining unit 18 determines that the biometric information of the user matches the biometric information of the registered user. Then, the authentication determining unit 18 authenticates the user as the registered user (step S206). When the user is authenticated, the authentication determining unit 18 notifies the authentication result to the processing unit 7. Then, the processing unit 7 permits the authenticated user to use an apparatus in which the biometric authentication device 1 is incorporated, or an apparatus to which the biometric authentication device 1 is connected.

On the other hand, when the degree of similarity is smaller than the authentication determination threshold value (No in step S205), the authentication determining unit 18 determines that the biometric information of the user does not match the biometric information of the registered user. Therefore, the authentication determining unit 18 does not authenticate the user (step S207). Then, the authentication determining unit 18 notifies the processing unit 7 of a result indicating that the user is not authenticated. In this case, the processing unit 7 rejects use, by the unauthenticated user, of an apparatus in which the biometric authentication device 1 is incorporated or an apparatus to which the biometric authentication device 1 is connected. The processing unit 7 may cause the display unit 2 to display a message indicating that authentication has failed. After step S206 or step S207, the processing unit 7 finishes the biometric authentication process.

Further, when a so-called one-to-N authentication method is used, in other words, when user identification information of registered users is not input, the matching unit 17 obtains a matching score for each of the registered users. The matching unit 17 selects a registered user whose matching score is maximum. The matching unit 17 passes, to the authentication determining unit 18, a maximum value of matching scores, and user identification information of a registered user corresponding to the maximum value. When the maximum value of matching scores is equal to or larger than the authentication determination threshold value, the authentication determining unit 18 authenticates the user, as a registered user corresponding to the maximum value of matching scores.

(Registration Process)

The registration unit 19 acquires the user name of a user to be registered from the input unit 3. Then, the registration unit 19 sets a user identification number for uniquely identifying the user. Further, the registration unit 19 stores the user name and the user identification number of the user in the storage device 5 along with the feature information for matching received from the feature extracting unit 16. Thereby, the user is registered as a registered user who is permitted to use an apparatus in which the biometric authentication device 1 is incorporated.

As described above, the image correction apparatus virtually rotates the hand in such a manner that the hand faces the imaging optical system of the biometric information acquiring unit in accordance with the position of the hand on an image. Then, the image correction apparatus perspectively projects the rotated hand on an imaging plane. Thereby, it is possible to correct distortion of the hand represented in the image due to distortion aberration or the like, without changing the viewing angle of the hand, as viewed from the imaging optical system.

According to a modified example, the correction amount calculating unit 14 may correct an inclination correction angle θx in a horizontal direction and an inclination correction angle θy in a vertical direction, which are determined by the inclination correction amount calculating unit 12, according to the following equations (3). The correction amount calculating unit 14 may obtain a rotation correction angle Φx in a horizontal direction and a rotation correction angle Φy in a vertical direction by substituting corrected inclination correction angles θ'x and θ'y in the equations (2), in place of the inclination correction angles θx and θy.

$$\theta'_x = C_x \times \theta_x$$

$$\theta'_y = C_y \times \theta_y$$

$$0 < C_x, C_y \leq 1 \qquad (3)$$

where Cx, Cy are respectively a correction coefficient. Setting the correction coefficients Cx, Cy to a value smaller than 1 reduces the rotation correction angles. This makes it possible to prevent excessive rotation of the hand by the correcting unit 15, for example, when the position of the reference point obtained from the position of the hand on a vein image is not optimum. Thus, the image correction apparatus is advantageous in preventing an increase in distortion of biometric information of the hand in a corrected image.

As the shift amounts Δx and Δy increase, an influence by distortion aberration of an imaging optical system increases, and the reference point is highly likely to be inappropriate. In view of the above, the correction amount calculating unit 14 may be configured to decrease the correction coefficient Cx, as the shift amount Δx increases. Likewise, the correction amount calculating unit 14 may be configured to decrease the correction coefficient Cy, as the shift amount Δy increases.

Further, according to another modified example, the correction amount calculating unit 14 may obtain rotation correction angles Φx, Φy according to the following equations (4), in place of the equations (2), with respect to one of the rotation correction angle Φx in a horizontal direction and the rotation correction angle Φy in a vertical direction obtained according to the equations (2), which is deviated from a predetermined allowable range.

$$\Phi_x = (\alpha_x + \theta_y) \times \kappa_x$$

$$\Phi_y = (\alpha_y + \theta_y) \times \kappa_y$$

$$0 \leq \kappa_x, \kappa_y < 1 \qquad (4)$$

where κx, κy are correction coefficients. The rotation correction angles Φx, Φy decrease by determining the rotation correction angles Φx, Φy according to the equations (4), as compared with the case of using the equations (2). In particular, setting the correction coefficients κx, κy to zero does not carry out an image correction process of rotating the hand in such a direction as to face the imaging optical system. The predetermined allowable range is set to a maximum allowable range of the inclination angle of the hand with respect to the imaging plane of the biometric information acquiring unit 4, for example, in the range of from −20° to +20° or in the range of from −15° to +15°.

When rotation correction angles are determined in accordance with the shift amounts Δx, Δy, and an inclination of the hand with respect to the imaging plane, the rotation correction angles may excessively increase. An excessive increase in the rotation correction angle may increase deformation of the hand on a corrected image by the correcting unit 15. This may cause superimposition of noise such as quantized noise on a corrected image. Such a noise may result in venous artifacts or may make it difficult to discriminate some of the veins. Thus, the noise may adversely affect when features of a vein pattern is extracted from an image. In view of the above, the correction amount calculating unit 14 obtains the rotation correction angles Φx, Φy according to the equations (4). This is advantageous in preventing superimposition of noise due to correction, on a corrected vein image.

Also in the modified example, the correction amount calculating unit 14 may be configured to decrease the correction coefficient κx, as the shift amount Δx increases. Likewise, the correction amount calculating unit 14 may be configured to decrease the correction coefficient κy, as the shift amount Δy increases.

Further alternatively, the correction amount calculating unit 14 may obtain rotation correction angles Φx, Φy according to the following equations (5), in place of the equations (4), with respect to one of the rotation correction angle Φx in a horizontal direction and the rotation correction angle Φy in a vertical direction obtained according to the equations (2), which is deviated from a predetermined allowable range.

$$\Phi_x = (\alpha_x + C_x \times \theta_x) \times \kappa_x$$

$$\Phi_y = (\alpha_y + C_y \times \theta_y) \times \kappa_y$$

$$0 \leq \kappa_x, \kappa_y < 1$$

$$0 < C_x, C_y \leq 1 \quad (5)$$

The above configuration is advantageous in suppressing a component resulting from an inclination correction angle with respect to the rotation correction angles Φx, Φy.

Furthermore, according to another modified example, the biometric information acquiring unit 4 may include a block on which the hand is placed. According to this configuration, the hand is expected to be placed substantially in parallel to the imaging plane. Therefore, the correction amount calculating unit 14 may obtain rotation correction angles Φx, Φy, assuming that the subject inclination angles αx, αy are zero in the equations (2), or in the equations (4), or in the equations (5). In this configuration, the subject inclination angle calculating unit 13 may be omitted.

Furthermore, according to another modified example, the image correction apparatus may be configured to virtually move the hand in front of the imaging optical system so that the hand faces the imaging optical system of the biometric information acquiring unit 4. Referring back to FIG. 1 again, it is clear that a virtual hand 100" indicated by the one-dotted chain line, which is obtained by moving the hand 100 on a plane 104 in parallel to the imaging plane onto the optical axis, faces to the imaging unit. In this case, as well as the inclination correction amount calculating unit 12, the correction amount calculating unit 14 obtains distances (ΔXw, ΔYw) in a horizontal direction and in a vertical direction from the optical axis OA of the imaging optical system to a point in the real space corresponding to a reference point, on the basis of a shift amount Δx in a horizontal direction and a shift amount Δy in a vertical direction. Then, the correction amount calculating unit 14 calculates a movement amount (−ΔXw) in a horizontal direction and a movement amount (−ΔYw) in a vertical direction, by which the point in the real space corresponding to the reference point is moved onto the optical axis OA along the plane 104, as correction amounts.

The correcting unit 15 moves the estimated coordinate representing a point in the real space corresponding to each pixel included in a subject region by the movement amount (−ΔXw) in a horizontal direction and by the movement amount (−ΔYw) in a vertical direction, and then, projects each of the points on the imaging plane by perspective projection transformation to obtain a corrected image.

According to this modified example, it is not necessary to calculate rotation correction amounts and to carry out correction by rotation. Therefore, the image correction apparatus is advantageous in reducing the computation amount.

Further, a computer program including instructions for causing a computer to implement the functions of the processing unit according to the embodiments may be provided in a form recorded in a recording medium, such as a magnetic recording medium, an optical recording medium, and a non-volatile semiconductor memory. Note that the computer-readable recording medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image correction apparatus, comprising:
    a processor configured to
      extract a region in which a hand is captured in an image;
      obtain a shift amount from a point on the image corresponding to an optical axis of an imaging unit included in an image acquiring device for generating the image to a reference point having a predetermined positional relationship with the region in which the hand is captured;
      calculate an inclination correction angle by which a plane in parallel to an imaging plane of the imaging unit is rotated to be orthogonal to a direction directing from the imaging unit toward a point in the real space corresponding to the reference point in accordance with the shift amount;
      calculate, in accordance with the inclination correction angle, a correction amount for placing the hand to face the imaging unit included in an image acquiring device for generating the image;
      correct, for each pixel included in a region in which the hand is captured in the image, an estimated coordinate representing a position of a point in a real space calculated based on the pixel in accordance with the correction amount; and
      project each of the points after the correction on a corrected image to generate the corrected image.

2. The image correction apparatus according to claim 1, wherein the processor is further configured to calculate an inclination angle of the hand with respect to the plane in parallel to the imaging plane, wherein the calculating the correction amount obtains the correction amount on the basis of a sum of the inclination angle of the hand and the inclination correction angle.

3. The image correction apparatus according to claim 1, wherein the reference point is a centroid of the region in which the hand is captured.

4. The image correction apparatus according to claim 1, wherein the reference point is a center of a circumscribed rectangle or of an inscribed rectangle of the region in which the hand is captured.

5. The image correction apparatus according to claim 1, wherein the calculating the correction amount obtains the correction amount on the basis of a value obtained by multiplying the inclination correction angle with a correction coefficient smaller than 1.

6. The image correction apparatus according to claim 1, wherein the calculating the correction amount sets, when the correction amount is equal to or larger than a predetermined allowable amount, a value obtained by multiplying the correction amount with a correction coefficient smaller than 1, as the correction amount.

7. The image correction apparatus according to claim 1, wherein the calculating the correction amount sets, when the correction amount is equal to or larger than a predetermined allowable amount, the correction amount to zero.

8. The image correction apparatus according to claim 1, wherein the processor calculates the inclination correction angle so that, as the shift amount increases, the inclination correction angle is larger.

9. An image correction method, comprising:

extracting, by a processor, a region in which a hand is captured in an image;

obtaining, by the processor, a shift amount from a point on the image corresponding to an optical axis of an imaging unit included in an image acquiring device for generating the image to a reference point having a predetermined positional relationship with the region in which the hand is captured;

calculating, by the processor, an inclination correction angle by which a plane in parallel to an imaging plane of the imaging unit is rotated to be orthogonal to a direction directing from the imaging unit toward a point in the real space corresponding to the reference point in accordance with the shift amount;

calculating, by the processor, in accordance with the inclination correction angle, a correction amount for placing the hand to face the imaging unit;

correcting, by the processor, for each pixel included in a region in which the hand is captured in the image, an estimated coordinate representing a position of a point in a real space calculated based on the pixel in accordance with the correction amount; and projecting, by the processor, each of the points after the correction on a corrected image to generate the corrected image.

10. The image correction method according to claim 9, further comprising:

calculating, by the processor, an inclination angle of the hand with respect to the plane in parallel to the imaging plane, wherein the calculating the correction amount obtains the correction amount on the basis of a sum of the inclination angle of the hand and the inclination correction angle.

11. The image correction method according to claim 9, wherein the reference point is a centroid of the region in which the hand is captured.

12. The image correction method according to claim 9, wherein the reference point is a center of a circumscribed rectangle or of an inscribed rectangle of the region in which the hand is captured.

13. The image correction method according to claim 9, wherein the calculating the correction amount obtains the correction amount on the basis of a value obtained by multiplying the inclination correction angle with a correction coefficient smaller than 1.

14. The image correction method according to claim 9, wherein the calculating the correction amount sets, when the correction amount is equal to or larger than a predetermined allowable amount, a value obtained by multiplying the correction amount with a correction coefficient smaller than 1, as the correction amount.

15. The image correction method according to claim 9, wherein the calculating the correction amount sets, when the correction amount is equal to or larger than a predetermined allowable amount, the correction amount to zero.

16. A non-transitory computer-readable recording medium having recorded thereon a computer program for image correction, the computer program causing a computer to execute a process comprising:

extracting a region in which a hand is captured in an image;

obtaining a shift amount from a point on the image corresponding to an optical axis of an imaging unit included in an image acquiring device for generating the image to a reference point having a predetermined positional relationship with the region in which the hand is captured;

calculating an inclination correction angle by which a plane in parallel to an imaging plane of the imaging unit is rotated to be orthogonal to a direction directing from the imaging unit toward a point in the real space corresponding to the reference point in accordance with the shift amount;

calculating, in accordance with the inclination correction angle, a correction amount for placing the hand to face the imaging unit;

correcting, for each pixel included in a region in which the hand is captured in the image, an estimated coordinate representing a position of a point in a real space calculated based on the pixel in accordance with the correction amount; and projecting each of the points after the correction on a corrected image to generate the corrected image.

* * * * *